UNITED STATES PATENT OFFICE 2,238,928

DERIVATIVES OF AMINES

Frank J. Cahn and Benjamin R. Harris, Chicago, Ill., assignors to The Emulsol Corporation, Chicago, Ill., a corporation of Illinois No Drawing. Application February 12, 1940, Serial No. 318,526

31 Claims. (Cl. 260—404)

This invention relates to new chemical compounds in the form of reaction or condensation products comprising derivatives of hydroxy amines, particularly hydroxy aliphatic secondary amines, said chemical compounds or reaction products being characterized by possessing interface modifying properties rendering said compounds highly useful for the purposes for which such agents are employed in the various arts.

In general, such compounds or reaction products comprise amides of hydroxy amines with aliphatic carboxylic acids containing not more than five carbon atoms, said compounds also including a higher molecular weight lipophile group, particularly an aliphatic or fatty acid acyl group. More particularly, most of the compounds comprise or may be characterized as amides of hydroxy-alkyl amines, especially hydroxy-alkyl secondary amines, with aliphatic acids containing not more than five carbon atoms, the hydrogen of one hydroxyl group of an hydroxy-alkyl group being replaced by a lipophile radical containing at least eight carbon atoms.

Many of the novel compounds of the present invention fall within the scope of the general formula:

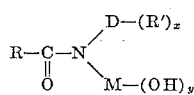

wherein

is an aliphatic acyl radical containing not more than five carbon atoms, D and M are the same or dissimilar organic radicals containing at least two carbon atoms, R' is an organic lipophile radical, and $x$ and $y$ are small whole numbers, for example, one or two.

A more limited aspect of the compounds of the present invention may be represented by the general formula

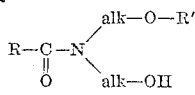

wherein

is an aliphatic acyl radical containing not more than five carbon atoms, alk is a member selected from the group consisting of alkylene, (alkylene-O-alkylene)$_t$ and (alkylene-S-alkylene)$_w$ where $t$ and $w$ are whole numbers, and R' is a lipophillic organic radical containing at least eight carbon atoms.

A further and still more limited aspect of the compounds of the present invention, covering especially preferred embodiments, may be represented by the general formula:

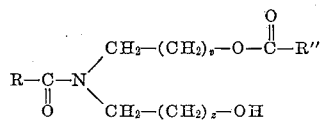

wherein

is a fatty acid acyl radical containing not more than five carbon atoms and preferably only two carbon atoms,

is a fatty acid acyl radical containing at least eight carbon atoms, and $v$ and $z$ are whole numbers.

The radical R' in the above formulae may be of aliphatic, cyclo-aliphatic, aromatic or aromatic-aliphatic character and may include substituent groups such as amino, hydroxy, halogen, sulphate, sulphonate, phosphate, carboxyl, nitrile, and the like, as will be pointed out hereinafter, but it is particularly preferred that it be unsubstituted aliphatic or fatty and contain at least eight and preferably from twelve to eighteen carbon atoms. D, M, and alk, likewise, may contain substituent groups such as amino, hydroxy, halogen, sulphate, sulphonate, phosphate, carboxyl, nitrile, and the like, and the sequence of carbon atoms therein may be interrupted by O, S, C=O, NH, NR where R is alkyl, and the like. It is especially preferred, however, that each of D, M and alk comprise unsubstituted alkylene radicals containing from two to four carbon atoms.

In order that the nature of the invention may become more apparent, there are listed hereinbelow representative compounds which fall within the scope of the present invention.
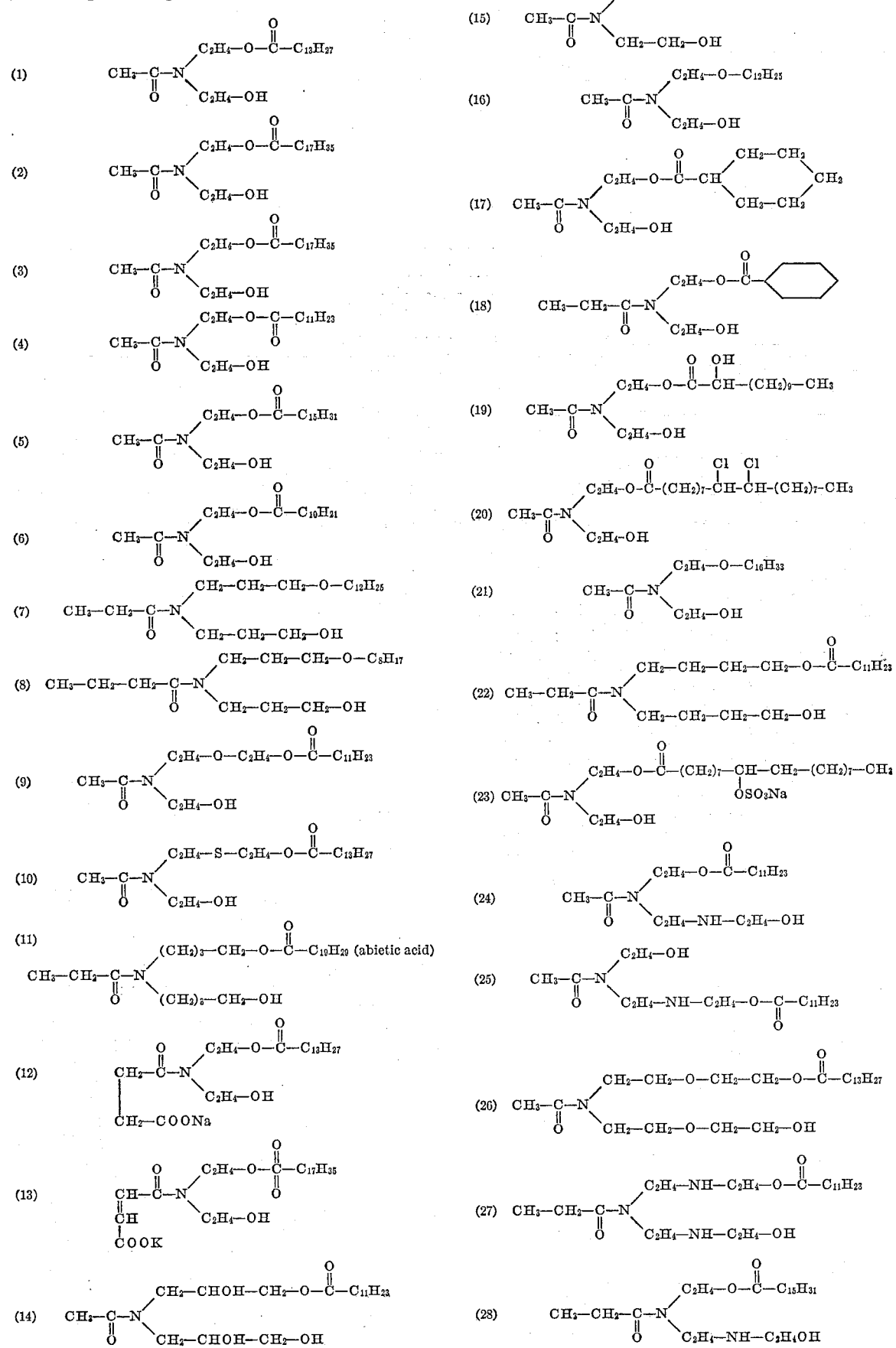

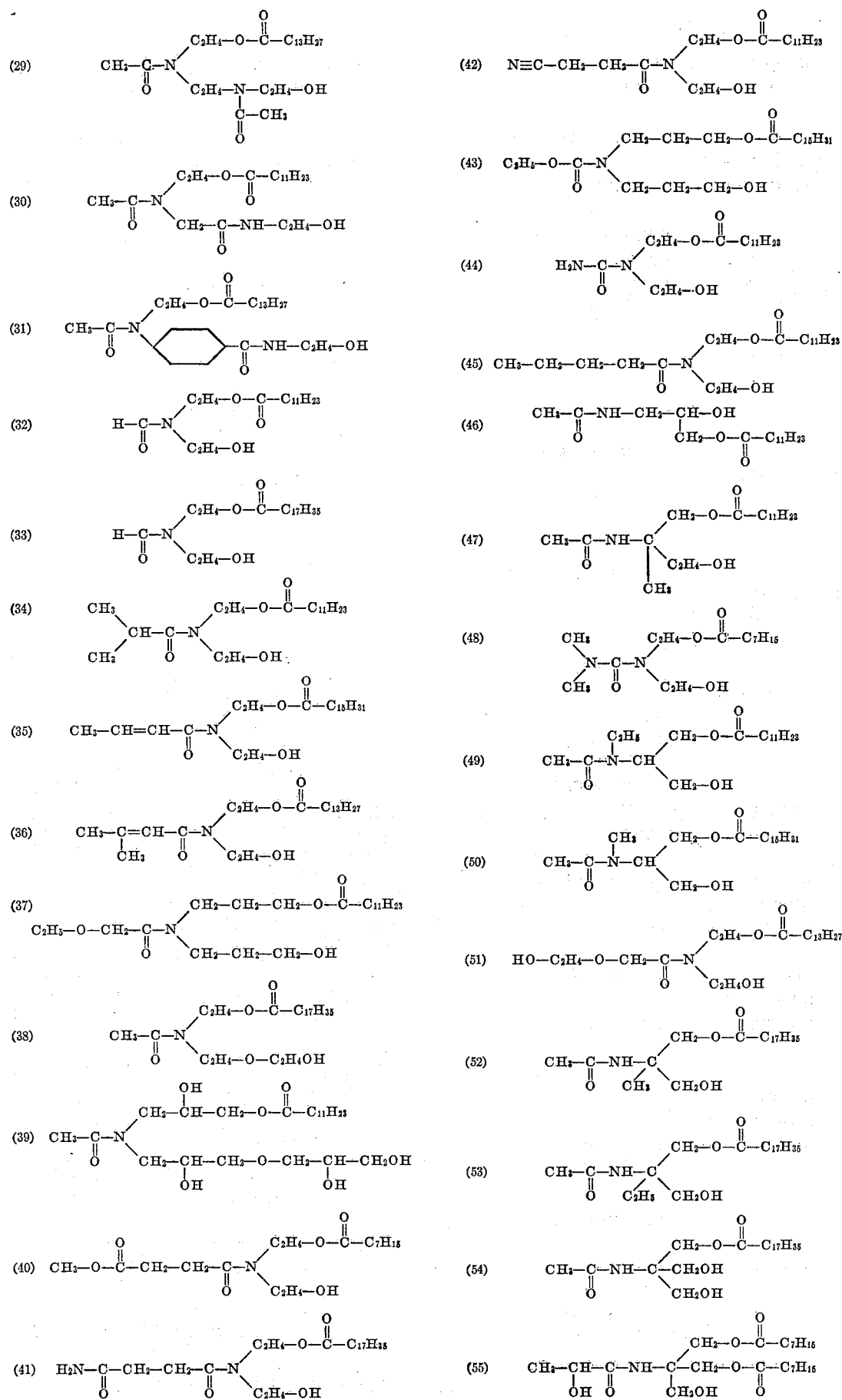

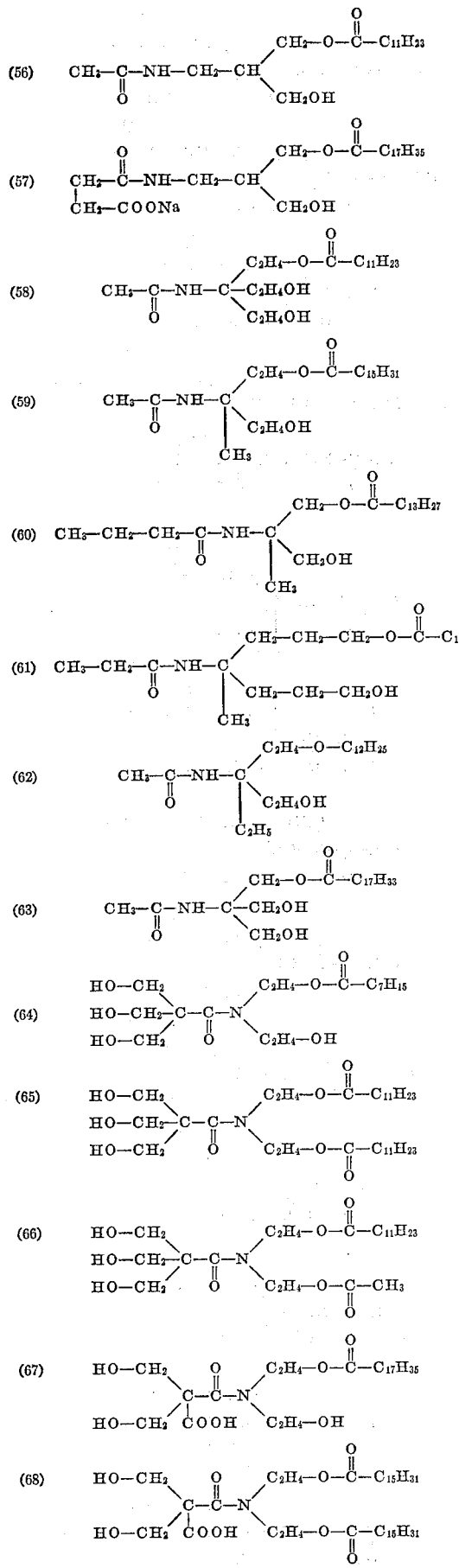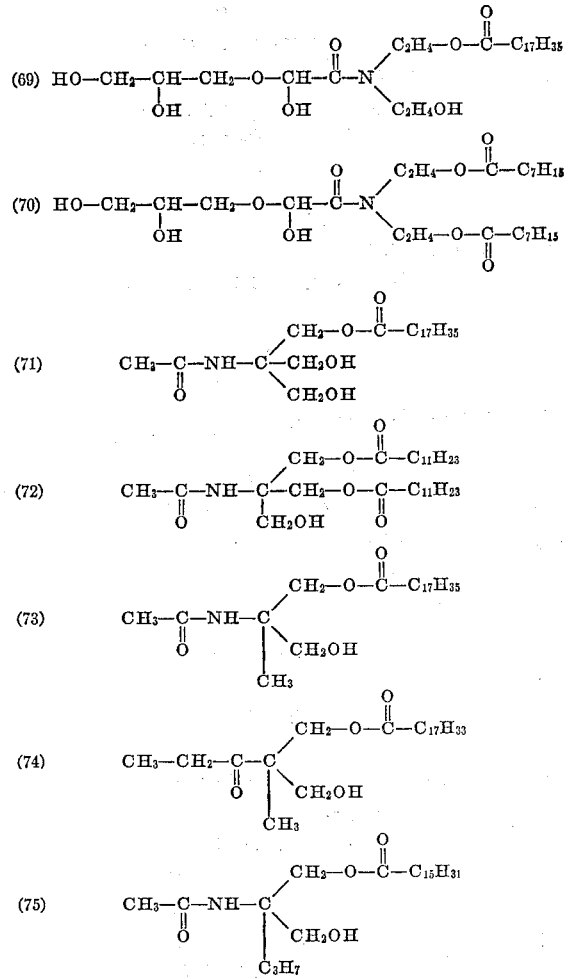

While the above examples represent single substances, it will be understood that, in practice, it is, in general, advantageous to employ the compounds in the form of reaction or condensation products or mixtures, which reaction mixtures contain preferably substantial proportions of said compounds. It will also be understood that mixtures of any two or more of the compounds may be utilized with or without diluents. It will furthermore be appreciated that, in the preparation of the compounds, the various higher fatty acids or the like, hydroxyl-alkyl amines and carboxylic acids containing not more than five carbon atoms may be utilized in numerous combinations and permutations to make large numbers of compounds not specifically mentioned but the preparation of which is, nevertheless, within the scope of the invention as pointed out more particularly in the claims.

In general, most of the compounds are prepared by initially reacting a hydroxy-alkyl amine containing hydrogen attached to nitrogen, and especially a hydroxy-alkyl secondary amine, for example, diethanolamine, with an aliphatic carboxylic acid containing not more than five carbon atoms, or a derivative of such acid such as the halide or ester thereof, for example, acetic acid, acetic anhydride, acetyl chloride, ethyl acetate or methyl acetate, under conditions such as assure a substantial yield of amide. The resulting amide is then reacted with a higher molecular weight organic acid or halide thereof or other lipophile compound in order to introduce a lipophile radical into the molecule, as hereinafter more clearly set forth. The following examples are illustrative of methods which have been found suitable for preparing various of the compounds which are disclosed herein.

It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will become evident to those skilled in the art in the light of the guiding principles which are disclosed herein.

Example A (1) 224 grams of methyl acetate (3 mols) and 210 grams of diethanolamine (2 mols) were mixed together, two layers forming at first, the mixture becoming a homogeneous mass after a short time. The mixture was refluxed for 19 hours at which time 90% of the diethanolamine had reacted. A portion of the reaction mixture was subjected to a vacuum of 6 millimeters at 60 degrees C. in order to drive off the volatile material, namely, the unreacted methyl acetate and the methyl alcohol which was formed during the reaction. The residue, upon titration, showed a content of 4.64% of free diethanolamine. To 192.5 grams of this residue, 34.7 grams of methyl acetate were added and the mixture was refluxed for 3½ hours. The resulting reaction product was then freed from its low boiling constituents, namely, the methyl alcohol and unreacted methyl acetate, by maintaining the mass at 70 degrees C. under a pressure of 6 millimeters. The residue contained approximately 0.8% of unreacted diethanolamine, based upon a determination of the alkalinity of said residue by titration. The product was a light yellow colored syrup, soluble in water, and contained a compound which was essentially the acetic acid amide of diethanolamine, having the following formula:

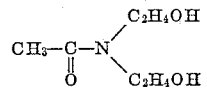

(2) 51.0 grams (2 mols) of the acetic acid amide of diethanolamine, produced as described in part (1) hereof, and 38.0 grams (1 mol) of lauric acid were heated together for 15 minutes at approximately 200 degrees C., while passing carbon dioxide gas through the reaction mixture. At the end of the 15 minutes, the free lauric acid has decreased to 1.3%. The product was a yellow colored syrup, dispersible in water and having good emulsifying and dispersing properties. It could be salted out of its solution by the addition thereto of sodium chloride. The product consisted essentially of a compound having the following formula:

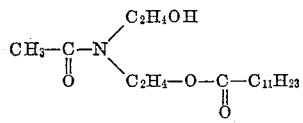

Example B 21.1 grams of the acetic acid amide of diethanolamine, produced as described in part (1) of Example A hereinabove, and 20 grams of lauric acid were heated at 200 degrees C. for 10 minutes, carbon dioxide gas being passed through the reaction mixture during the reaction in order to remove the water formed as a result of the esterification. The product was a yellow oil, essentially devoid of free fatty acid and freely dispersible in water. It had good emulsifying and dispersing properties. By the addition of sodium chloride to the solution it could be salted out. The reaction product contained essentially the monolauric acid ester of the acetic acid amide of diethanolamine.

Example C (1) 156 grams of methyl lactate and 157.5 grams of diethanolamine were refluxed for 3 hours at 94 degrees C., the alkalinity calculated as diethanolamine dropping from 50.5% to 5.4%. To the reaction mass 78 grams of methyl lactate were added and refluxing was continued for 3½ hours at 95 degrees C. The alkalinity dropped to 0.9% expressed as diethanolamine. The excess methyl lactate and the methyl alcohol which formed during the reaction were removed by distillation at a pressure of 10 mm. and at a temperature up to about 120 degrees C. The reaction product was a reddish brown, water-soluble, somewhat viscous material and comprised largely or essentially the lactic acid amide of diethanolamine.

(2) 37.3 grams of the lactic acid amide of diethanolamine, produced in part (1) hereof, and 9.8 grams of lauric acid were heated together to 60 degrees C. whereupon a homogeneous solution resulted, and the heating was then continued for 20 minutes at 140 degrees C., for 20 minutes at 150 degrees C., for 20 minutes at 170 degrees C. and for 15 minutes at 180 degrees C. The reaction product was a reddish brown oil which possessed good emulsifying properties and which also foamed well even in acidified aqueous media. The product contained a substantial proportion of the lauric acid mono-ester of the lactic acid amide of diethanolamine.

As examples 7, 8, 16 and 21 show, the compounds may also comprise higher molecular weight ether derivatives. The higher molecular weight ethers may be prepared, for example, by reacting a compound containing a reactive halogen—

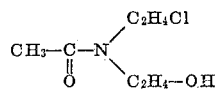

with an alkali metal alcoholate such as sodium laurylate or sodium octylate in accordance with general methods known in the art. In general, the higher fatty acid esters are more particularly satisfactory for most purposes and are, therefore, especially preferred.

The organic radical represented by R in the formulae may be derived from various sources. Among the sources may be mentioned acetic acid, ethyl acetate, methyl acetate, acetic anhydride, acetyl chloride, aceto-acetic acid, formic acid, lactic acid, propionic acid, butyric acid, hydroxybutyric acid, furoic acid, ketene, tartaric acid, succinic acid, maleic acid, fumaric acid, crotonic acid; trimethylol acetic acid, dimethylol malonic acid, and homologues thereof; and, in general, aliphatic carboxylic acids, their esters, anhydrides and acyl halides, and substitution derivatives of said acids such as hydroxy, hydroxy-alkyl, and carboxylic derivatives, which contain not more than five carbon atoms. Of especial utility in most cases, for the purposes of the present invention, are acetic acid, its esters and halides.

The organic radical represented by R', in other words the lipophile group, in the various general formulae hereinabove may also be derived from a plurality of sources among which may be mentioned, for example, straight chain and branched chain, saturated and unsaturated, carboxylic, aliphatic (including cycloaliphatic), fatty, aromatic, hydroaromatic, and araliphatic acids including caprylic acid, capric acid, pimelic acid, sebacic acid, behenic acid, arachidic acid, cerotic acid, erucic acid, melissic acid, stearic acid, oleic acid, ricinoleic acid, ricinelaidic acid, ricinostearolic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completely hydrogenated animal and vegetable oils such as those mentioned; oxidized and/or polymerized higher fatty acids or higher fatty acids derived from oxidized and/or polymerized triglyceride oils; acyloxy carboxylic acids such as

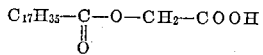

hydroxy and alpha-hydroxy higher carboxylic, aliphatic and fatty acids such as i-hydroxy stearic acid, dihydroxypalmitic acid, dihydroxystearic acid, dihydroxybehenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydro-aromatic acids such as abietic acid; araliphatic and aromatic acids such as phthalic acid, Twitchell fatty acids, naphthoic acid; naphthenic acids; hydroxy aromatic acids such a hydroxy naphthoic acids, and the like and substitution and addition derivatives of the aforementioned acids, in particular, halogen addition and substitution derivatives. It will be understood that mixtures of any two or more of said acids may be employed if desired and it will also be appreciated that said acids may contain substituent groups such as sulphate, sulphonic, nitrile, thiocyanogen, carbonyl, amide, amine or substituted amine, halogen, ketone and other groups. The acids may be employed as such or in the form of derivatives thereof such as carboxylic acid acyl halides, esters and the like. Of particular utility are the fatty acids or their acyl halides containing at least twelve and preferably from sixteen to eighteen carbon atoms.

In those cases where higher molecular weight ethers of the amides of the hydroxy-alkyl amines are prepared, the higher molecular weight ether radical may be derived from alcoholates prepared from alcohols corresponding to the higher molecular weight acids referred to hereinabove.

The hydroxy amines which are reacted with the acetic acid or the like to produce the intermediate amide include, among others, by way of example, diethanolamine, dipropanolamine, dibutanolamine, dipentanolamine, dihexanolamine, 2-methylamino-propan-diol-1,3; 1-phenylamino-propan-diol-2,3; 1-hydroxy-ethylamino-2, methoxy-propan-ol-3; 2-N-methylamino-propan-diol-1,3; monoethanol monopropanolamine, monoethanol monobutanolamine, glycerol monoamines, namely, 1-amino-2,3-propanediol and 2-amino-1,3-propanediol; diglycerol-amine; hydroxylamine ($H_2N-OH$) and derivatives thereof such as result from replacement of one amine hydrogen by an alkyl such as methyl, ethyl, propyl, butyl and the higher homologues; hydroxy amines, particularly secondary hydroxy amines, derived from polyhydric alcohols, including sugars and sugar alcohols such as dextrose, sucrose, sorbitol, mannitol and dulcitol,

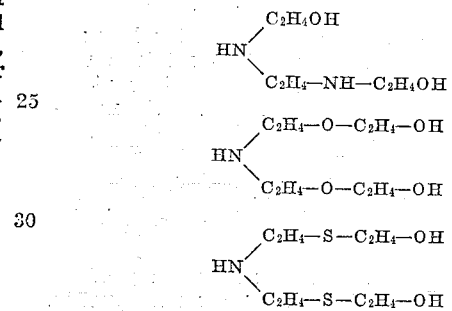

and the like; 2-amino-2-methyl-1,3-propanediol; trimethylol amino methane; 2-amino-2-n-proply-1,3-propanediol; 2-amino-2-isopropyl-1,3-propanediol; 2-amino-2-ethyl-1,3-propanediol; 2-amino-2-methyl-1,4-butanediol; 2-amino-2-methyl-1,5-pentanediol; 2-amino-2-ethylol-1,3-propanediol; 2-amino-2-methyl-1,6-hexanediol; 1-amino-1,1-dimethyl ethanol; trimethylol amino-methyl methane; trimethylol aminomethylol methane; polymerized non-tertiary hydroxy amines or polymerized hydroxy amines containing hydrogen directly attached to nitrogen and prepared, for example, by polymerizing monoethanolamine or diethanolamine or mixtures thereof, or other hydroxy amines such as those mentioned hereinabove, particularly in the presence of a catalyst such as sodium hydroxide or the like. The glycerol mono-amines and the related hydroxy amines such as various of those disclosed hereinabove may be prepared by various procedures and in different ways. Many of them are conveniently produced by nitrating paraffin hydrocarbons, substituting methylol groups for hydrogen on the carbons to which nitro groups are attached, and then reducing the nitro groups to amine groups. These amine groups may be further alkylated or otherwise substituted if desired. The preparation of polymerized hydroxy amines is disclosed, for examples, in United States Patent No. 2,178,173; and homologues and substitution derivatives of the above-mentioned hydroxy amines. Because of commercial and other considerations, diethanolamine is especially desirable. It will be understood that the hydroxy amines may be utilized in pure, impure or commercial form.

The especial utility of the compounds described hereinabove for the various purposes of the present invention, as mentioned hereinafter, appears to result from a particular coaction among the acetamide or similar amide group, the higher molecular weight acyl or alkyl group or the like, and the free hydroxyl or similar group or groups, the combined result of which is to impart the highly desirable characteristics which are found in said compounds. While, as described hereinabove, the compounds contain at least one free or unesterified hydroxy group as, for example, in the case of the acetic acid amide of the monolauric acid ester of diethanolamine, it may be pointed out that, in some instances, the hydroxy group may be replaced by such groups as amino, carboxyl, and the like, or the hydrogen of the hydroxyl group or groups may be replaced by acetyl, lactyl and similar groups. However, the compounds function much more satisfactorily with a free or unesterified hydroxyl group or groups and they are, therefore, particularly preferred.

In the preparation of the compounds of the present invention, the various higher molecular weight fatty acids or the like, the hydroxy amines, and the carboxylic acids containing not more than five carbon atoms may be utilized in numerous combinations and permutations to make large numbers of compounds not specifically mentioned but which are obviously within the scope of the invention.

The compounds of the present invention have utility in various arts in which interface modifying agents are employed. Many of them are resistant to precipitation by calcium and magnesium salts and are compatible with acid and alkali media. They may, in general, be utilized in washing and laundering and in the textile and related industries wherein they function for wetting, lathering, detergent, emulsifying, penetrating, softening, finishing, dispersing, frothing and foaming purposes. The textiles, various treatments of which in the presence of the agents of the present invention is rendered effective, comprise natural products such as cotton, wool, linen and the like as well as the artificially produced fibres, (and fabrics) such as rayon, cellulose acetates, cellulose ethers and similar artificial silk fabrics and silk and wool substitutes. It will be understood of course, that the agents may be used in aqueous and other media either alone or in combination with other suitable salts of organic or inorganic character or with other interface modifying agents. In the dyeing of textiles many of them may be employed as assistants in order to bring about even level shades. Many of them also may be used in the leather industry as wetting agents in soaking, dyeing, tanning and the softening and other treating baths for hides and skins. Their utility as emulsifying agents enables them to be employed for the preparation of emulsions which may be used for mothproofing, insecticidal, fungicidal and for similar agriculture purposes. They have utility in the preparation of hair washes and hair shampoos, dentifrices of liquid, cream and powder type, cosmetic creams such as cold creams, vanishing creams, tissue creams, antiperspiration creams and other anti-perspiration preparations, shaving creams of the brushless and lathering type and similar cosmetic preparations. Another use to which many of the agents of the invention may be placed is for the treatment of paper or paper pulp or the like. Their capillary or interfacial tension reducing properties enables them to be employed in the fruit and vegetable industry in order to effect the removal from fruits and the like of arsenical and similar sprays. They possess utility in the ore dressing industry wherein they function effectively in froth flotation and agglomeration processes. They are also of especial utility as addition agents to electroplating baths for the deposition of metals such as copper, nickel, chromium and the like, in view of their non-ionic character. Their interface modifying properties also permit their use in lubricating oils and the like enabling the production of effective boring oils, cutting oils, drilling oils, wire drawing oils, extreme pressure lubricants and the like. Many of them may also be used with effect in the preparation of metal and furniture polishes, shoes polishes, in rubber compositions, for breaking or demulsifying petroleum emulsions such as those of the water-in-oil type which are encountered in oil-field operations, and with advantage in paints and the like, and for various other purposes which will readily occur to those versed in the art in the light of the disclosure herein.

As detergents, they may in general be dissolved in water or aqueous media and utilized in that form or, in the case of solid products, they may be packaged and sold in such form preferably mixed with diluents. They may also be utilized for commercial cleansing, laundering and washing operations with advantage.

It will be understood that the products of the present invention may be employed for their various purposes either alone or together with lesser or greater quantities of inorganic or organic compounds. Thus, for example, many of them may be employed together with salts such as sodium chloride, alkali metal phosphates including pyrophosphates and tetraphosphates, sodium sulphate, alums, perborates such as sodium perborate, and the like. Many of said products may be utilized in alkaline or acid media in the presence of sodium carbonate, sodium bicarbonate, dilute acids such hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivates such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl mono-ethanolamine sulpho-acetate, and the like; sulphuric and sulphonic derivatives of condensation products of alkylolamines and higher fatty acids; reaction products of phosphoric, pyrophosphoric, meta-phosphoric, tetraphosphoric, and polyphosphoric acids with higher molecular weight alcohols; Turkey-red oils; compounds of the type of isopropyl naphthalene sodium sulphonate, and other classes of wetting agents.

The present application is a continuation-in-part of our prior application, Serial No. 306,584, filed November 28, 1939.

What we claim as new and desire to protect by Letters Patent of the United States is:

1. Amides of hydroxy aliphatic secondary amines corresponding to the general formula

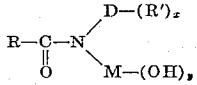

wherein

is an aliphatic acyl radical containing not more than five carbon atoms, D and M are the same or dissimilar organic radicals containing at least two carbon atoms, R' is an organic lipophile radical containing at least eight carbon atoms, and $x$ and $y$ are small whole numbers.

2. Amides of hydroxy aliphatic secondary amines corresponding to the general formula

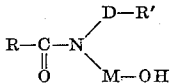

wherein

is an aliphatic acyl radical containing not more than five carbon atoms, D and M are the same or dissimilar organic radicals containing at least two carbon atoms, and R' is a member selected from the group consisting of aliphatic alkyl and acyl radicals containing at least eight carbon atoms.

3. Amides of secondary amines with an aliphatic acid containing not more than five carbon atoms, said secondary amine containing two hydroxy-alkyl radicals, the hydrogen of the hydroxyl group of only one of said hydroxy-alkyl radicals being replaced by a lipophile radical containing at least eight carbon atoms.

4. Amides of hydroxy aliphatic secondary amines corresponding to the general formula

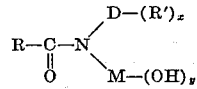

wherein

is an aliphatic hydroxyl-containing acyl radical having not more than five carbon atoms, D and M are the same or dissimilar organic radicals containing at least two carbon atoms, R' is an organic aliphatic lipophile radical containing at least eight carbon atoms and $x$ and $y$ are small whole numbers.

5. Amides of hydroxy aliphatic secondary amines corresponding to the general formula

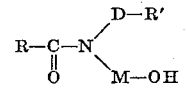

wherein

is an aliphatic acyl radical containing not more than five carbon atoms, D and M are the same or dissimilar organic radicals containing at least two carbon atoms, and R' is a fatty acid acyl radical containing at least eight carbon atoms.

6. Chemical compounds corresponding to the general formula

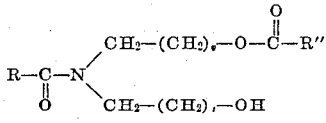

wherein

is a fatty acid acyl radical containing not more than five carbon atoms, $$-\underset{\underset{O}{\|}}{C}-R''$$

is a fatty acid acyl radical containing at least eight carbon atoms, and $v$ and $z$ are whole numbers.

7. Chemical compounds corresponding to the general formula

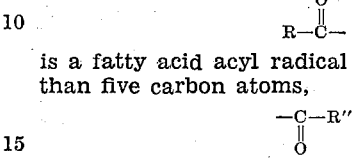

wherein alk is a member selected from the group consisting of alkylene, (alkylene-O-alkylene)$_t$ and (alkylene-S-alkylene)$_w$ where $t$ and $w$ are whole numbers, and R' is a lipophilic aliphatic radical containing at least eight carbon atoms.

8. Chemical compounds corresponding to the general formula

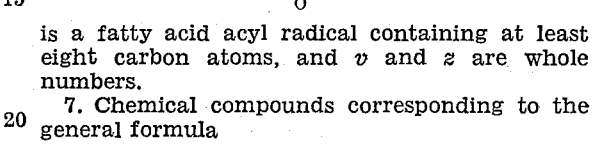

wherein $$-\underset{\underset{O}{\|}}{C}-R''$$

is a fatty acid acyl radical containing from eight to eighteen carbon atoms, and $v$ and $z$ are whole numbers.

9. Chemical compounds corresponding to the general formula

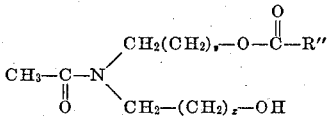

wherein

is an aliphatic hydroxy-containing acyl radical having not more than five carbon atoms, $$-\underset{\underset{O}{\|}}{C}-R''$$

is a fatty acid acyl radical containing from eight to eighteen carbon atoms, and $v$ and $z$ are whole numbers.

10. Chemical compounds corresponding to the general formula

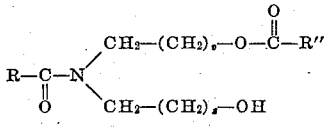

wherein

is an aliphatic acyl radical containing not more than five carbon atoms, alk is a member selected from the group consisting of alkylene, (alkylene-O-alkylene)$_t$ and (alkylene-S-alkylene)$_w$ where $t$ and $w$ are whole numbers, and R' is an alkyl radical containing at least eight carbon atoms.

11. Chemical compounds corresponding to the general formula

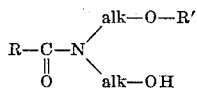

wherein

is an aliphatic acyl radical containing not more than five carbon atoms, alk is a member selected from the group consisting of alkylene, (alkylene-O-alkylene)$_t$ and (alkylene-S-alkylene)$_w$ where $t$ and $w$ are whole numbers, and R' is an acyl radical containing at least eight carbon atoms.

12. Chemical compounds corresponding to the general formula

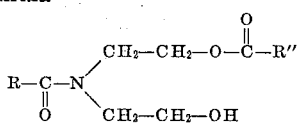

wherein

is a fatty acid acyl radical containing not more than five carbon atoms, and

is a fatty acid acyl radical containing at least eight carbon atoms.

13. Chemical compounds corresponding to the general formula

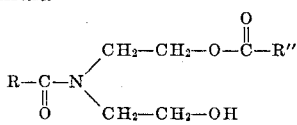

wherein

is an acyl radical containing a plurality of hydroxy groups and not more than five carbon atoms, and

is a fatty acid acyl radical containing at least eight carbon atoms.

14. Chemical compounds corresponding to the general formula

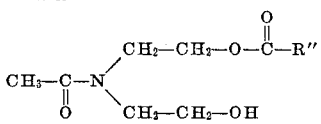

wherein

is a fatty acid acyl radical containing at least eight carbon atoms.

15. Chemical compounds corresponding to the general formula

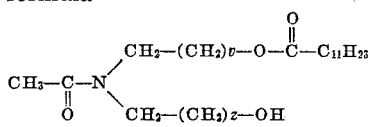

wherein $v$ and $z$ are whole numbers.

16. Amides of secondary polyamines with aliphatic acids containing not more than five carbon atoms, said secondary polyamines containing at least two hydroxy-alkyl radicals, the hydrogen of the hydroxyl group of only one of said hydroxy-alkyl radicals being replaced by a lipophile radical containing at least eight carbon atoms.

17. Amides of dihydroxy aliphatic secondary amines with carboxylic acids containing not more than five carbon atoms, the hydrogen of only one hydroxy group of said hydroxy amines being replaced by an aliphatic radical containing at least eight carbon atoms.

18. Amides of dihydroxy aliphatic secondary amines with carboxylic acids containing not more than five carbon atoms, the hydrogen of only one hydroxy group of said hydroxy amines being replaced by an aliphatic acyl radical containing at least eight carbon atoms.

19. The acetic acid amide of the mono-lauric acid ester of diethanolamine.

20. Amides of hydroxy aliphatic secondary amines with carboxylic acids containing not more than five carbon atoms, hydrogen of hydroxy groups of said hydroxy-amines being replaced by an aliphatic radical containing at least eight carbon atoms.

21. Chemical compounds in the form of amides of aliphatic hydroxy-amines with aliphatic carboxylic acids containing not more than five carbon atoms, said chemical compound also including a higher molecular weight carboxylic acyl radical having at least eight carbon atoms.

22. Amides of hydroxy-alkyl amines with carboxylic acids containing not more than five carbon atoms, said compounds also containing at least one free hydroxy group and at least one lipophile group having at least eight carbon atoms.

23. Chemical compounds comprising amides of hydroxy-alkyl secondary amines with aliphatic carboxylic acids containing not more than five carbon atoms, said compounds also containing at least one free hydroxyl group and at least one acyl radical having at least eight carbon atoms.

24. Chemical compounds in the form of reaction products comprising largely amides of hydroxy-alkyl secondary amines with aliphatic hydroxy-carboxylic acids containing not more than five carbon atoms, said compounds also containing at least one fatty acid acyl radical having a chain of at least eight carbon atoms.

25. Amides of secondary aliphatic amines with aliphatic carboxylic acids containing not more than five carbon atoms, at least one of the two groups which are carbon-linked to the nitrogen of the secondary amine being an hydroxy-alkyl radical the hydrogen of the hydroxyl group of which is replaced by a lipophile radical containing at least eight carbon atoms.

26. A chemical compound in the form of an acetic acid amide of an aliphatic hydroxy-amine, said chemical compound also containing a fatty acid acyl radical having from eight to eighteen carbon atoms.

27. A chemical compound in the form of an amide of an hydroxy-amine with an aliphatic carboxylic acid containing not more than five carbon atoms, said chemical compound also including a carboxylic acyl radical having at least eight carbon atoms.

28. Chemical compounds comprising amides of polymerized hydroxy-alkyl amines with aliphatic carboxylic acids containing not more than five carbon atoms, said chemical compounds also including a carboxylic acyl radical having at least eight carbon atoms.

29. Derivatives of amino polyhydroxy aliphatic alcohols, said amino polyhydroxy aliphatic alcohols being characterized by having a carbon atom thereof linked to one amino group, to one alkyl group, and to two alkylol groups, hydrogen of said amino group being replaced by a carboxylic acyl radical having not more than five carbon atoms, and hydrogen of an hydroxy group of said alkylol groups being replaced by a lipophile group having at least eight carbon atoms.

30. Chemical compounds corresponding to the general formula

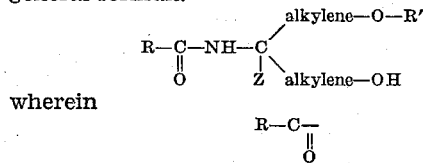

wherein

is an aliphatic acyl radical containing not more than five carbon atoms, R' is an organic lipophile radical containing at least eight carbon atoms, and Z is a member selected from the group consisting of hydrogen, alkyl, cycloalkyl, and alkylol.

31. Chemical compounds corresponding to the general formula

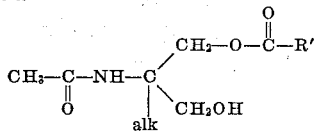

wherein

R'—C—
‖
O is a fatty acid acyl radical containing at least eight carbon atoms, and alk is a member of the group consisting of methyl, ethyl, propyl, and iso-propyl.

FRANK J. CAHN.
BENJAMIN R. HARRIS.